United States Patent
Gordon

(10) Patent No.: US 10,482,012 B1
(45) Date of Patent: Nov. 19, 2019

(54) STORAGE SYSTEM AND METHOD OF OPERATING THEREOF

(71) Applicant: STORONE LTD., Ra'anana (IL)

(72) Inventor: Raz Gordon, Hadera (IL)

(73) Assignee: STORONE LTD., Ra'anana (IL)

( * ) Notice: Subject to any disclaimer, the term of this patent is extended or adjusted under 35 U.S.C. 154(b) by 209 days.

(21) Appl. No.: 14/969,957

(22) Filed: Dec. 15, 2015

Related U.S. Application Data

(60) Provisional application No. 62/098,673, filed on Dec. 31, 2014.

(51) Int. Cl.
*G06F 12/02* (2006.01)
*G06F 3/06* (2006.01)

(52) U.S. Cl.
CPC ........ *G06F 12/0292* (2013.01); *G06F 3/0608* (2013.01); *G06F 3/0631* (2013.01); *G06F 3/0644* (2013.01); *G06F 3/0665* (2013.01); *G06F 3/0683* (2013.01); *G06F 12/0284* (2013.01); *G06F 2212/1041* (2013.01); *G06F 2212/151* (2013.01); *G06F 2212/254* (2013.01); *G06F 2212/261* (2013.01); *G06F 2212/651* (2013.01); *G06F 2212/657* (2013.01)

(58) Field of Classification Search
CPC ............. G06F 12/0292; G06F 12/0284; G06F 3/0608; G06F 3/0631; G06F 3/0644; G06F 3/0665; G06F 3/0683; G06F 2212/1041; G06F 2212/151; G06F 2212/254; G06F 2212/261; G06F 2212/657; G06F 2212/651
See application file for complete search history.

(56) References Cited

U.S. PATENT DOCUMENTS

| | | | |
|---|---|---|---|
| 6,175,900 B1 | 1/2001 | Forin et al. | |
| 6,874,062 B1 | 3/2005 | Goldberg | |
| 7,900,008 B2 | 3/2011 | Shmueli et al. | |
| 8,281,103 B2 | 10/2012 | Han et al. | |
| 8,312,242 B2 | 11/2012 | Casper et al. | |
| 2008/0111716 A1* | 5/2008 | Artan | G06F 17/30949 341/50 |
| 2010/0125583 A1* | 5/2010 | Casper | G06F 17/30067 707/745 |
| 2011/0314246 A1* | 12/2011 | Miller | G06F 3/0613 711/170 |

\* cited by examiner

*Primary Examiner* — Rocio Del Mar Perez-Velez
*Assistant Examiner* — Jane Wei
(74) *Attorney, Agent, or Firm* — Oliff PLC

(57) ABSTRACT

Disclosing a storage system, method of operating thereof and data structures usable for the operating. The method includes: accommodating a plurality of data structures informative of location of allocation chunks, each allocation chunk characterized by a predefined number K of available consecutive physical addresses; wherein the predefined number K is equal for all allocation chunks indicated by the same data structure and wherein there are at least two data structures informative of location of allocation chunks with a different predefined number K; identifying, prior to writing a data chunk, a data structure associated with respective logical group and informative of location of allocation chunks with the predefined number K equal to number M of consecutive physical addresses required for storing the data chunk; and allocating for the data chunk M consecutive physical addresses in accordance with the location of the allocation chunk, the location obtained from the identified data structure.

11 Claims, 5 Drawing Sheets

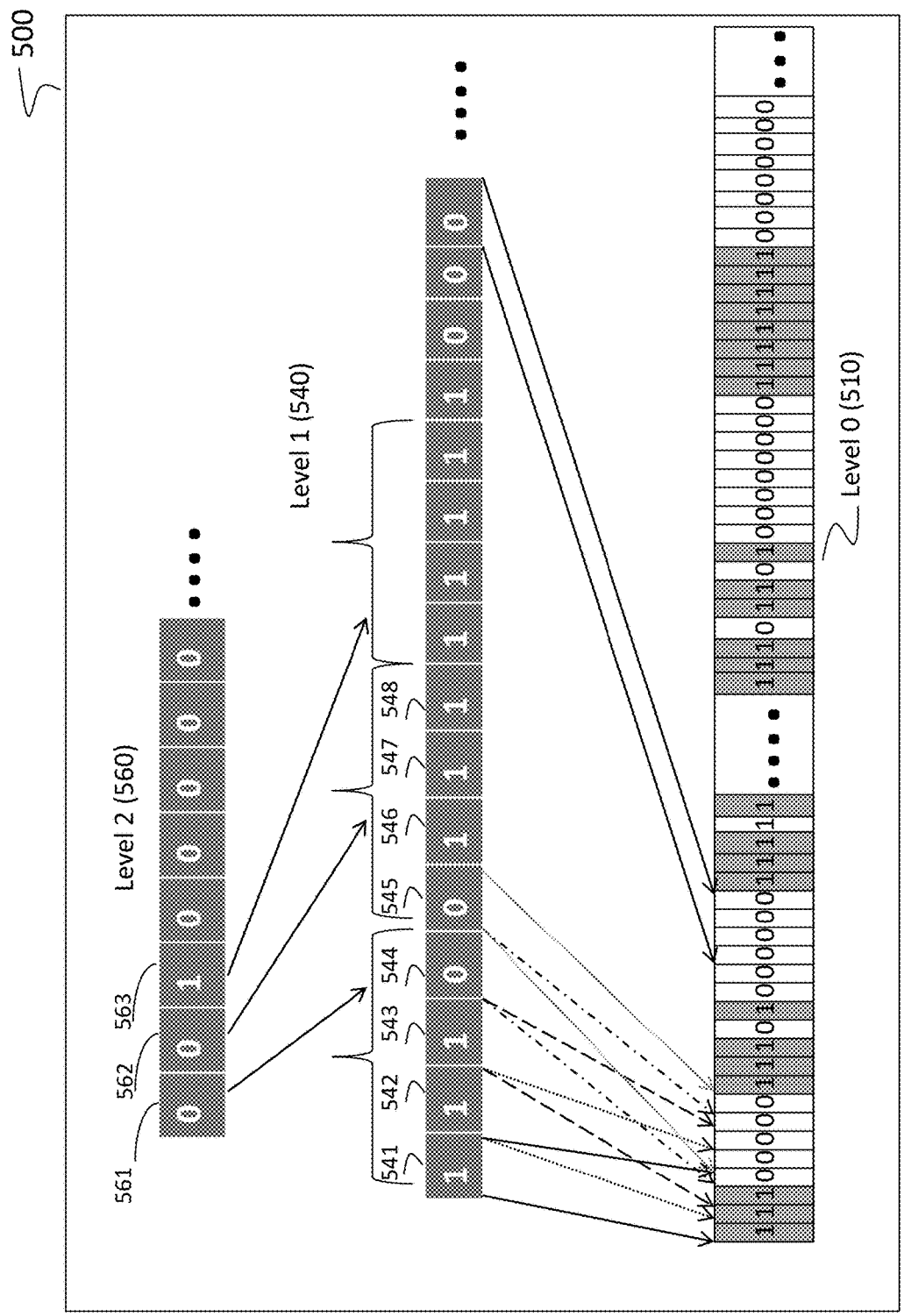

STORAGE SYSTEM AND METHOD OF OPERATING THEREOF

TECHNICAL FIELD

The presently disclosed subject matter relates to data storage management and, more particularly, to managing storage space allocation in data storage systems.

BACKGROUND OF THE INVENTION

For today's complex mass storage systems, management of storage space allocation has become essential for efficient operation. Problems of tracking available storage space and managing allocating thereof have been recognized in the conventional art and various techniques have been developed to provide solutions. For example:

U.S. Pat. No. 8,312,242 discloses a technique of tracking memory space in a storage system. The disclosed method comprises using a hierarchical bitmap tree in a file system to represent where available and unavailable memory space exists in a storage system, the hierarchical bitmap tree having plural bitmap blocks, wherein each of at least some of the bitmap blocks is associated with summary information about bitmap blocks at a lower level in the hierarchical bitmap tree, and wherein the summary information comprises a count of free storage blocks of one or more available sizes in the memory space; and retrieving a particular bitmap block from the hierarchical bitmap tree to locate the available memory space, wherein a size of the hierarchical bitmap tree is dynamic and changes as a size of the memory space in the file system increases or decreases.

U.S. Pat. No. 8,281,103 discloses a method and apparatus for allocating storage addresses. The method includes: receiving a storage address allocation request; searching a level-2 bitmap in a hierarchical bitmap in bidirectional mode; outputting an idle bit according to the result of searching in the level-2 bitmap; obtaining a storage address according to the output idle bit, and allocating the storage address. The apparatus includes: a first receiving module, configured to receive a storage address allocation request; a first searching module, configured to search a level-2 bitmap in a hierarchical bitmap in bidirectional mode for an idle bit, wherein the hierarchical bitmap includes N level-1 bitmaps and the level-2 bitmap; and an allocating module, configured to: obtain a storage address according to the output idle bit in the level-2 bitmap, and allocate the obtained storage address.

U.S. Pat. No. 7,900,008 discloses a method and system for allocating blocks of disk in persistent storage to requesting threads. A primary data structure is provided for organizing and categorizing blocks of disk space. In addition, a secondary data structure is provided for maintaining a list of all active file system processes and blocks of disk space used by those processes. Blocks of disk space are assigned to pages. At such time as a thread may request allocation of disk space, both data structures are reviewed to determine if the requested disk space is available and to limit access of available disk space to a single page of memory to a single thread at any one time.

U.S. Pat. No. 6,874,062 discloses a system and method for locating, within a set of ordered items, N contiguous items having a desired attribute. The system utilizes a hierarchical bitmap structure. At the lowest level, a bitmap is provided, wherein each bit in the bitmap corresponds to a respective search item. The bit has a state indicative of a state of the search item. This lowest level bitmap is divided into segments. A higher-level bitmap is created, with each bit in this higher-level bitmap being associated with one of the segments and being assigned a state that describes a collective state of the search items associated with the segment. The higher-level bitmap may be sub-divided and the process repeated to create a hierarchical bitmap structure having any number of levels. The bitmap structure may be recursively searched to locate N contiguous ordered search items having a desired attribute.

U.S. Pat. No. 6,175,900 discloses a hierarchical bitmap-based memory manager that maintains a hierarchical bitmap having an entry for each memory block in a memory heap. Each bitmap entry contains a multi-bit value that represents an allocation state of the corresponding memory block. The memory manager manages allocation, deallocation, and reallocation of the memory blocks, and tracks the changes in allocation state via the hierarchical bitmap. Using a-two-bit value, the bitmap can represent at most four different allocation states of the corresponding memory block, including a "free" state, a "sub-allocated" state in which the corresponding memory block is itself an allocated set of smaller memory blocks, a "continue" state in which the corresponding memory block is allocated and part of, but not last in, a larger allocation of plural blocks, and a "last" state in which the corresponding memory block is allocated and last in an allocation of one or more memory blocks.

GENERAL DESCRIPTION

In accordance with certain aspects of the presently disclosed subject matter, there is provided a method of operating a storage system comprising a plurality of physical storage devices constituting a physical storage space characterized by physical addresses and controlled by a plurality of storage control devices constituting a storage control layer, the storage control layer operable to represent to a plurality of hosts a logical address space divided into one or more logical groups. The method comprises: maintaining in a memory accessible to the storage control layer a plurality of data structures, each data structure associated with a logical group and being informative of location in the physical storage space of allocation chunks, each allocation chunk being characterized by a predefined number K of available consecutive physical addresses; wherein the predefined number K is equal for all allocation chunks indicated by the same data structure and wherein there are at least two data structures informative of location of allocation chunks with a different predefined number K. The method further comprises: prior to writing to the physical storage space a data chunk associated with a given logical group, identifying, among the plurality of data structures, a data structure associated with the given logical group and informative of location of allocation chunks with the predefined number K equal to number M of consecutive physical addresses required for storing the data chunk; allocating for the data chunk M consecutive physical addresses in accordance with the location of the allocation chunk, the location obtained from the identified data structure; and, upon completion of writing the data chunk, updating, in accordance with availability of consecutive physical addresses resulted from completion, at least all data structures associated with all logical groups sharing at least part of the physical address space with the identified data structure.

In accordance with further aspects of the presently disclosed subject matter, the data structure can be configured as an hierarchical multilevel bitmap comprising at least two bitmaps, wherein each bit in a first bitmap, being a bitmap of the lowest level, corresponds to a physical address in the physical address space and bear indication of availability of corresponding data block; and wherein each bit in a second bitmap, being a parent of the first bitmap, corresponds to K bits in the first bitmap and bears indication of availability of data chunk of K consecutive data blocks corresponding to respective K bits in the first bitmap.

The data structure can further comprise a third bitmap, being a parent of the second bitmap, wherein each bit the third bitmap corresponds to predefined number N of bits in the second bitmap and bears an indication of aggregated availability status of corresponding N data chunks mapped by the second bitmap.

Optionally, the data structure can comprise a plurality of third bitmaps organized in hierarchical manner, wherein each bit in a third bitmap being a parent of the second bitmap corresponds to predefined number N of bits in the second bitmap and bears an indication of aggregated availability status of corresponding N data chunks mapped by the second bitmap; and wherein each bit in a third bitmap of a next hierarchical level corresponds to predefined number N of bits in a previous hierarchical level and bears an indication of aggregated availability status of corresponding N data chunks mapped by N bits of the previous level bitmap.

A number of levels in the data structure can be defined by Log N(Y), where Y is the total number of bits in the first bitmap and N=K.

In accordance with other aspects of the presently disclosed subject matter, there is provided a storage system configured to operate in accordance with the method above.

In accordance with other aspects of the presently disclosed subject matter, there is provided a non-transitory computer readable medium storing instructions that, when executed by a storage system, cause the storage system to perform the method above.

In accordance with other aspects of the presently disclosed subject matter, there is provided a non-transitory computer readable medium storing a data structure capable to be used for the method above. The data structure is configured as an hierarchical multilevel bitmap comprising at least two bitmaps, wherein each bit in a first bitmap, being a bitmap of the lowest level, corresponds to a physical address in the physical address space and bear indication of availability of corresponding data block; and wherein each bit in a second bitmap, being a parent of the first bitmap, corresponds to K bits in the first bitmap and bears indication of availability of data chunk of K consecutive data blocks corresponding to respective K bits in the first bitmap.

The data structure can comprise one or more third bitmaps organized in hierarchical manner, wherein each bit in a third bitmap being a parent of the second bitmap corresponds to predefined number N of bits in the second bitmap and bears an indication of aggregated availability status of corresponding N data chunks mapped by the second bitmap; and wherein each bit in a third bitmap of a next hierarchical level corresponds to predefined number N of bits in a third bitmap of a previous hierarchical level and bears an indication of aggregated availability status of corresponding N data chunks mapped by N bits in the third bitmap of the previous level.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 5 illustrates a schematic diagram of another exemplified location-informative data structure in accordance with certain embodiments of the presently disclosed subject matter.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "representing", "controlling", "generating", "indicating", "writing", "identifying", "updating" or the like, refer to the action(s) and/or process(es) of a computer that manipulate and/or transform data into other data, said data represented as physical, such as electronic, quantities and/or said data representing the physical objects. The term "computer" should be expansively construed to cover any kind of electronic device with data processing capabilities including, by way of non-limiting example, the storage system and storage control layer disclosed in the present application.

It is to be understood that the term "non-transitory" is used herein to exclude transitory, propagating signals, but to include, otherwise, any volatile or non-volatile computer memory technology suitable to the presently disclosed subject matter.

The operations in accordance with the teachings herein may be performed by a computer specially constructed for the desired purposes or by a general-purpose computer specially configured for the desired purpose by a computer program stored in a computer readable storage medium.

The references cited in the background teach many principles of managing storage space allocation that may be applicable to the presently disclosed subject matter. Therefore the full contents of these publications are incorporated by reference herein where appropriate, for appropriate teachings of additional or alternative details, features and/or technical background.

Figure 1:
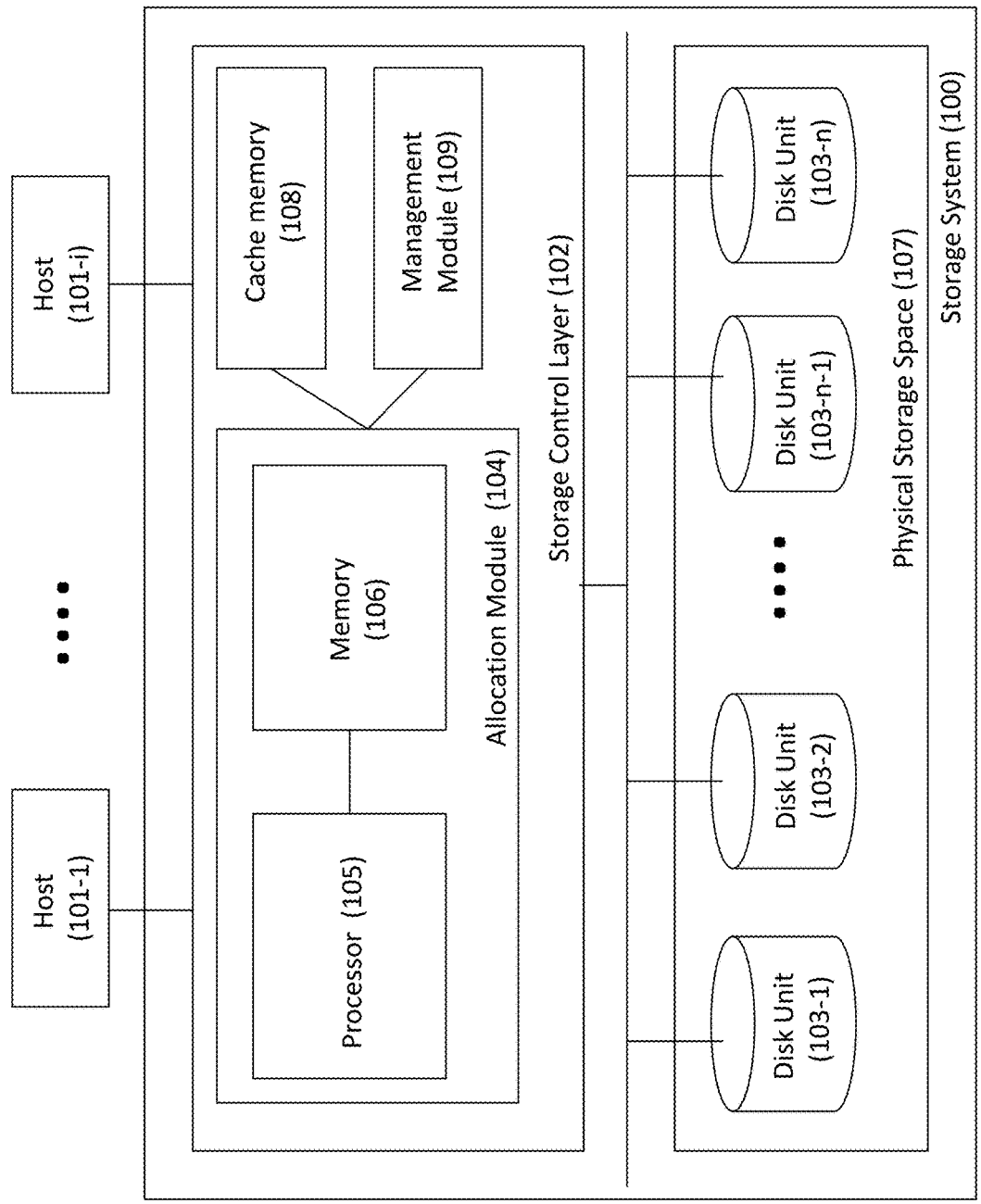
FIG. 1 illustrates a functional block diagram of a storage system in accordance with certain embodiments of the presently disclosed subject matter.

Bearing this in mind, attention is drawn to FIG. 1 illustrating a non-limiting example of a schematic functional diagram of a storage system in accordance with certain embodiments of the presently disclosed subject matter.

The illustrated storage system 100 provides common storage means to be shared by a plurality of host computers (illustrated as 101-1-101-*n*). The storage system comprises a control layer 102 comprising one or more appropriate storage control devices (not shown) operatively coupled to the plurality of host computers and operable to control access operations between the plurality of host computers and a plurality of data storage devices (illustrated as disk units 103-1-103-*n*). The data storage devices constitute a physical storage space 107 optionally distributed over one or more storage nodes, wherein the storage control layer is operable to control interface operations (including access operations) between the host computers and the physical storage space. The storage system is configured in a manner enabling direct or indirect servicing a request directed at any available address in the physical storage space.

The physical storage space can comprise any appropriate permanent storage medium and can include, by way of non-limiting example, a plurality of physical disk drives (PD) organized in one or more arrays. The physical storage space 107 comprises a plurality of data blocks characterized by successive physical addresses. By way of non-limiting example, a physical address of a given data block can be derived from a pair ($DD_{id}$, DBA), and where $DD_{id}$ is a serial number associated with respective physical disk drive accommodating the given data block, and DBA is a block number within the respective disk. Typically, a data block has a size $S_b$ of the smallest storage unit that is addressable by a hard drive (e.g. 512 bytes, 4096 bytes, etc.).

Stored data can be logically represented to a client in terms of logical objects. Depending on storage protocol, the logical objects may be logical groups (e.g. logical volumes, virtual partitions, snapshots, combinations of a given logical volume and its respective one or more snapshots, etc.), data files, multimedia files, etc. For purpose of illustration only, the following description is provided with respect to logical groups represented by logical volumes. Those skilled in the art will readily appreciate that the teachings of the present subject matter are applicable in a similar manner to other logical groups.

A logical volume (LV) is a virtual entity logically representing a plurality of data blocks and acting as basic units for data handling and organization within the system. Logical volumes are characterized by successive Logical Block Addresses (LBA) ranging from 0 to a number Y, wherein Y is the number of data blocks comprised in the logical volume. Different LVs may comprise different numbers of logical data blocks, while the size of logical data blocks is typically equal to the size of physical data blocks.

The storage control layer 102 comprises an allocation module 104 operationally coupled to a cache memory 108 and a management module 109, the modules configured to facilitate operations in accordance with the presently disclosed subject matter as further detailed with reference to FIGS. 2-5. The allocation module 104 comprises a processor 105 operatively coupled to a memory 106. The allocation module 105, the cache memory 108 and management module 109 can be implemented as a centralized module(s) operatively connected to the plurality of storage control devices or its functions can be, at least partly, distributed over a part or all storage control devices.

Typically although not necessarily, definition of LVs and/or other objects in the storage system can involve in-advance configuring an allocation scheme and/or allocation function used to determine the intended location of the various data portions across the physical storage medium. Sometimes, (e.g. in some cases of thin volumes or snapshots) the pre-configured allocation is only performed when, for the first time after definition of the volume, a write command is directed at a certain block therein.

An example of an alternative known approach is a log-structured storage based on an append-only sequence of data entries. Whenever the need arises to write new or modified data, instead of finding a formerly allocated location for it on the disk drive, the storage system appends the data to the end of the log. Indexing the data can be accomplished in a similar way (e.g. metadata updates can be also appended to the log) or can be handled in a separate data structure (e.g. index table).

The storage system can be configured to support write-in-place and/or write-out-of-place techniques. In a write-in-place technique modified data is written back to its original physical location on the disk drive, overwriting the older data. In contrast, a write-out-of-place technique writes (e.g. in log form) a modified data block to a new physical location in the storage space. Thus, modified data is written to a new physical location so that the previous, unmodified version of the data is retained, but the reference to it is typically deleted or respectively updated, the storage space at that location therefore becoming free for reuse. A non-limiting example of the write-out-of-place technique is the known write-anywhere technique (detailed, by way of non-limiting example, in US Patent application No. 2005/246382), enabling writing data blocks to any available disk drive without prior allocation.

The storage control layer 102 defines a physical location(s) for writing data (e.g. a location designated in accordance with an allocation scheme, preconfigured rules and policies stored in the allocation module or otherwise and/or location available for a log-structured storage). The time of definition can depend on the implementation, for instance occurring when receiving a write request, at the time of destage, etc. When receiving a read request from the host, the storage control layer identifies the physical location(s) of the desired data and further processes the request accordingly. The storage control layer can, optionally, redirect the request/update to storage device(s) with appropriate storage location(s) irrespective of the specific storage control device receiving I/O request.

Those versed in the art will readily appreciate that the teachings of the presently disclosed subject matter are not bound by the system illustrated in FIG. 1, equivalent and/or modified functionality can be consolidated or divided in another manner. The storage system and parts thereof can be implemented in any appropriate combination of software, firmware and hardware.

Figure 2:
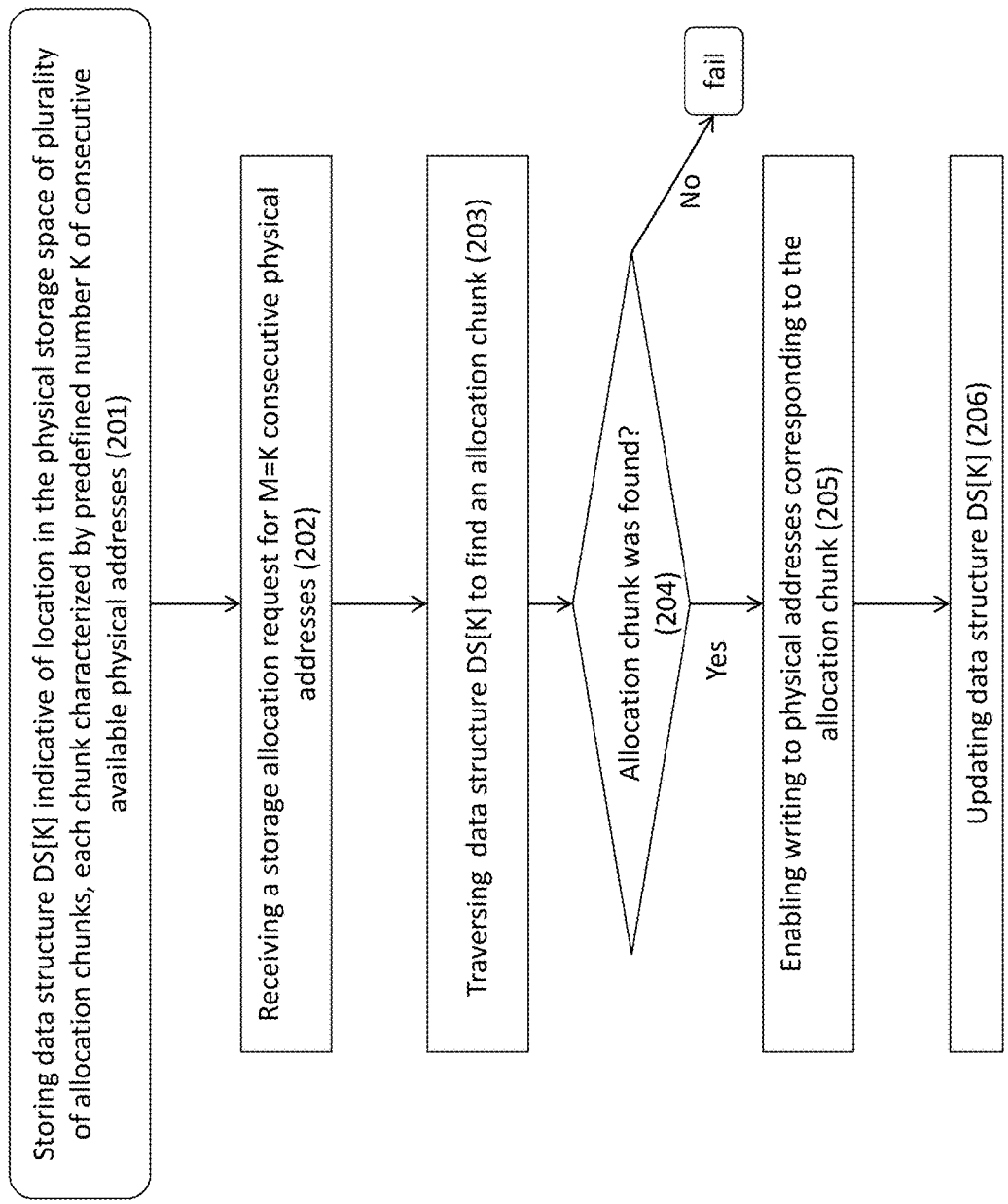
FIG. 2 illustrates a generalized flow-chart of writing a data chunk to a physical storage space using a location-informative data structure in accordance with certain embodiments of the presently disclosed subject matter.

Referring to FIG. 2, there is illustrated a generalized flow-chart of writing a data chunk to a physical storage space using a location-informative data structure.

In accordance with certain embodiments of the presently disclosed subject matter, the storage system can be configured to write data to the permanent storage in data chunks of a dynamically definable number M of consecutive data blocks, M to be dynamically defined by the storage control layer. In the following description a size of data chunks to be written is presented by number M of consecutive data blocks.

Optionally, the memory 106 can store a look-up table (or equivalent data structure) specifying a value of M depending on operational parameters (e.g., on operational parameters of the storage system in general and/or on operational parameters related to storage resources involved in writing the respective data chunks, etc.). The management module can define the size of data chunks to be written (i.e. the number M of consecutive data blocks) by selecting the respective value in the look-up table in accordance with current (and/or predicted) operational parameters. Alternatively or additionally, the management module can be configured to define the number M of consecutive data blocks by calculating the required value in accordance with predefined criteria (e.g. related to a size of respective metadata structures). The management module can be configured to define the size of data chunks to be written in a scheduled manner, and/or responsive to predefined events (e.g. I/O latency exceeding a predefined threshold), and/or responsive to a user-specified input, etc.

In accordance with certain embodiments of the presently disclosed subject matter, the management module can be configured to define equal size (i.e. equal number M of consecutive data blocks) for all data chunks related to a given logical group. However, this equal size can vary in time in accordance with predefined criteria (e.g. depending on load conditions related to storage resources involved in the respective writing process, expected read patterns, expected write patterns, defragmentation process requirements, calculation of best contiguous size for meeting some application-level criteria, etc.).

The size of data chunks to be written into consecutive data blocks can also vary for different logical groups, depending, for example, on the Service Level Specification (SLS) requirement associated with a certain logical group.

In accordance with certain embodiments of the presently disclosed subject matter, the allocation module can be configured to generate and maintain (201) at least one data structure DS[K] informative of location of a plurality of allocation chunks in the physical storage space, each allocation chunk characterized by a predefined number K of consecutive available physical addresses. Such a data structure is also referred to hereinafter as a location-informative data structure. The location-informative data structure can be generated and updated by the processor 105 and stored in the memory 106. A non-limiting example of location-informative data structure is further detailed with reference to FIG. 4.

The control layer obtains one or more data chunks to be written in physical storage space in M consecutive physical addresses and issues respective allocation requests to the allocation module.

By way of non-limiting example, the storage control layer 102 can be configured to segment, prior to writing to the permanent storage, data portions (received in a write request and/or to be destaged) into data chunks of size $S_w$ corresponding to the defined number M of consecutive data blocks in the permanent storage, $S_w=M*S_b$. Alternatively or additionally, the storage control layer 102 can be configured to cache in the cache memory 108 a plurality of data portions corresponding to one or more incoming write requests, consolidate the cached data portions related to the same logical group in accordance with predefined rules into a consolidated write request, and enable writing the consolidated write request in data chunks of the size $S_w$ corresponding to the defined number M of consecutive data blocks in the permanent storage. When necessary, the writing data chunks can be rounded to the defined size (e.g. by entering padding data such as random characters, blanks, zeros, etc.).

Optionally, the storage control layer can be configured to transform data received in a write request and/or data to be destaged prior to writing the transformed (e.g. encrypted and/or compressed) data to the permanent storage in data chunks of the size $S_w$ corresponding to the defined number M of consecutive data blocks in the permanent storage.

Optionally, the storage control layer can be configured to write data in data chunks of a dynamically definable number M of consecutive data blocks only if the respective data match predefined criteria. For example, in a case of write-in-place mode, the storage control layer can be configured to issue allocation requests for M consecutive data chunks only when writing new data, while allocating physical storage space for replacing existing data can be provided in any appropriate way known in the art.

Upon receiving (202) a storage allocation request for allocation of K=M consecutive physical addresses, the allocation module 104 traverses (203) the data structure DS[K] to find an allocation chunk with K consecutive available physical addresses and the respective location (e.g. start physical address) of the chunk. The allocation module can receive the storage allocation request responsive to an I/O write request received by the storage system and/or responsive to destaging data from the cache memory to the physical storage space.

If an allocation chunk has been found (204), then the allocation module provides data informative of location of K=M consecutive available physical addresses corresponding to the found allocation chunk, and the storage control layer enables writing (205) the respective data chunk to the respective addresses. If an allocation chunk has not been found, the allocation module can generate an indication of failure.

Upon completion of writing, the allocation module updates (206) the location-informative data structures DS [K] in accordance with availability of consecutive physical addresses resulting from the writing completion.

Operations 202 through 206 are executed repeatedly for each next data chunk to be written to the physical storage space in M=K consecutive physical addresses. Those versed in the art will readily appreciate that the storage system can be configured for concurrently and independently writing a plurality of data chunks to the same physical storage space, in such case the operations 202 and 205 can be provided concurrently and independently, while operations 203, 204 and 206 shall be provided in a coordinated manner (e.g. serialized and/or prioritized).

Figure 3:
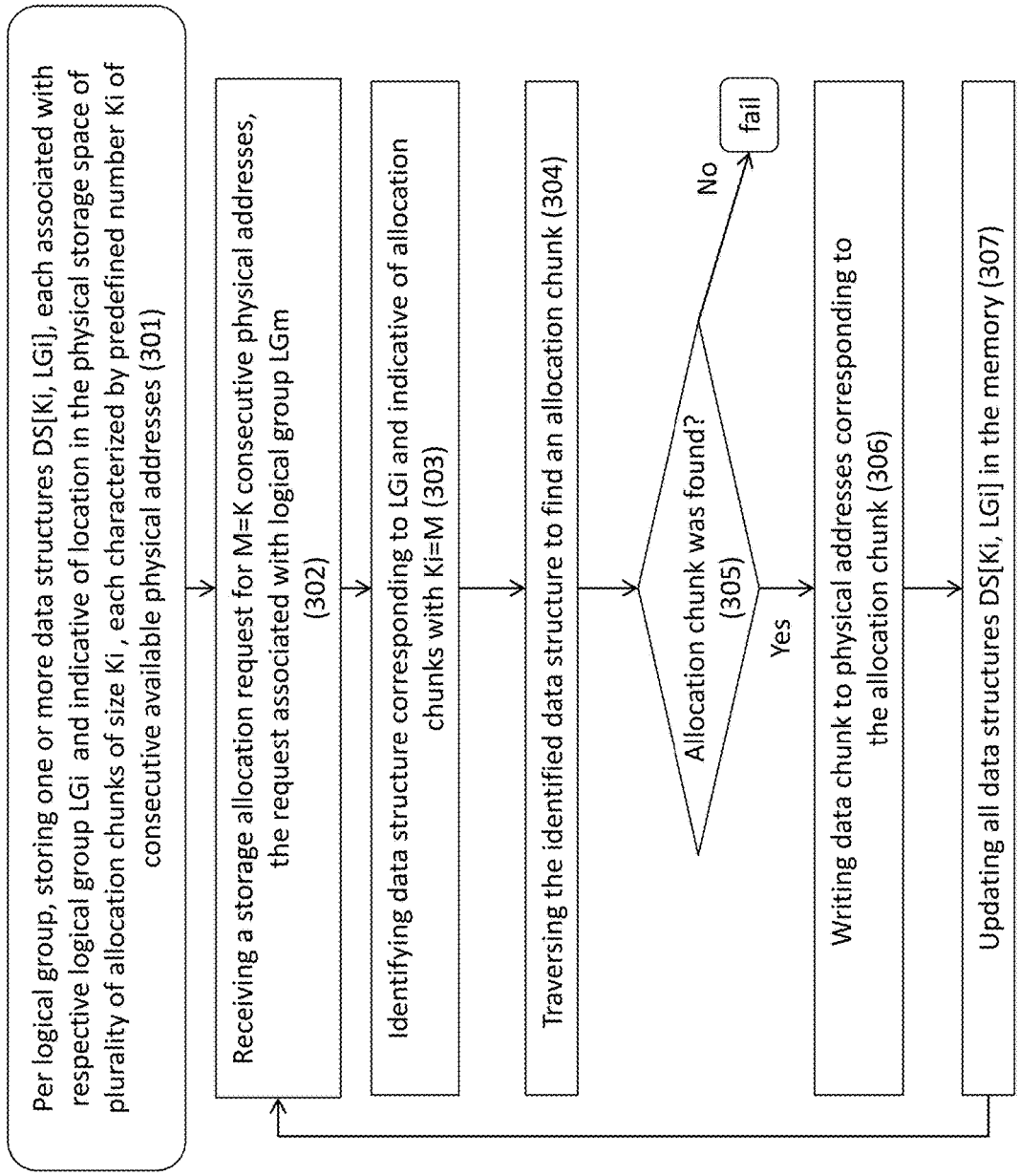
FIG. 3 illustrates a generalized flow-chart of writing a data chunk to a physical storage space using multiple location-informative data structures in accordance with certain embodiments of the presently disclosed subject matter.

Referring to FIG. 3, there is illustrated a generalized flow-chart of writing a data chunk to a physical storage space using multiple location-informative data structures.

In accordance with certain embodiments of the presently disclosed subject matter, the allocation module can be further configured to generate and maintain a plurality of location-informative data structures. A data structure $DS[K_i, LG_i]$ is associated with a logical group $LG_i$ and informative of location of allocation chunks with size $K_i$. Each logical group is associated with at least one location-informative data structure. Optionally, a given data structure (e.g. associated with a given logical group) can be informative of allocation chunks with physical addresses which, at least partly, overlap with physical addresses of allocation chunks specified in another data structure (e.g. associated with another logical group), such data structures are referred to hereinafter as "overlapped data structures". In a case of a plurality of location-informative data structures associated with a given logical group, such data structures differ by a number $K_i$ of consecutive available physical addresses in respective allocation chunks. Location-informative data structures associated with different logical groups $LG_i$ can also differ by a number of consecutive available physical addresses in respective allocation chunks. The plurality of location-informative data structures $DS[K_i, LG_i]$ can be stored (301) in the memory 106.

As has been detailed with reference to FIG. 2, the storage control layer can be configured to obtain one or more data chunks to be written in physical storage space in M consecutive physical addresses and to issue respective allocation requests to the allocation module.

When receiving (302) a storage allocation request for allocation of physical addresses, the allocation module obtains data indicative of a logical group $LG_{i=A}$ corresponding to the data chunk to be written and a value of number K=M of consecutive physical addresses to be allocated. By way of non-limiting example, such data can be received together with the allocation request or received, in a push and/or pull mode, from the storage control layer (e.g. from the management module) responsive to the received allocation request. Optionally, values of number M corresponding to different logical groups can be stored in the memory 106, updated by the management module when re-selected and/or recalculated, and retrieved by the allocation module responsive to the received storage allocation request.

The allocation module further identifies (303) data structure $DS[K_i, LG_i]$ corresponding to $LG_{i=A}$ and informative of allocation chunks with $K_i$=M. The allocation module 104 traverses (304) the identified data structure $DS[K_i=M, LG_{i=A}]$ to find an allocation chunk with K consecutive available physical addresses and the respective location of the chunk.

If an allocation chunk has been found (305), the allocation module provides data informative of K consecutive available physical addresses corresponding to the found allocation chunk, and the storage control layer enables writing (306) the received data chunk to the respective addresses. If an allocation chunk has not been found, the allocation module can generate an indication of failure.

Optionally, in certain embodiments of the presently disclosed subject matter, the control layer can define the size of data chunks to be written as $M_{min} \leq M \leq M_{max}$ consecutive data blocks, where $M_{max}$ is the maximal number of consecutive data blocks in the written data chunk and $M_{min}$ is the minimal number thereof. In such a case, the allocation module starts with data structure $DS [K_i=M_{max}, LG_{i=A}]$. If an allocation chunk of size $K=M_{max}$ has not been found, the allocation module repeats operations (303)-(306) for data structures with successively decreasing $K_i$ until the allocation data chunk is found or $K_i=M_{min}$. If an allocation chunk has not been found in a data structure with $K_i=M_{min}$, the allocation module can generate an indication of failure.

Upon completion of writing, the allocation module updates (307) at least all location-informative data structures DS $[K_i, LG_i]$ associated with the logical group $LG_{i=A}$ in accordance with availability of consecutive physical addresses resulting from the writing completion. In certain embodiments of the presently disclosed subject matter, the allocation module updates all location-informative data structures associated with all logical groups sharing at least one location-informative data structure (e.g. location-informative data structure associated with a logical volume and its snapshot(s)). Alternatively or additionally, the allocation module can be configured to update all overlapped location-informative data structures associated with all logical groups sharing at least part of the physical address space.

Operations 302 through 307 are executed repeatedly for each next data chunk to be written to the physical storage space in M=K consecutive physical addresses. Those versed in the art will readily appreciate that the storage system can be configured for concurrently and independently writing a plurality of data chunks to the same physical storage space, in such case the operations 302, 303 and 306 can be provided concurrently and independently, while the operations 304, 305 and 307 shall be provided in a coordinated manner (e.g. serialized and/or prioritized).

Figure 4:
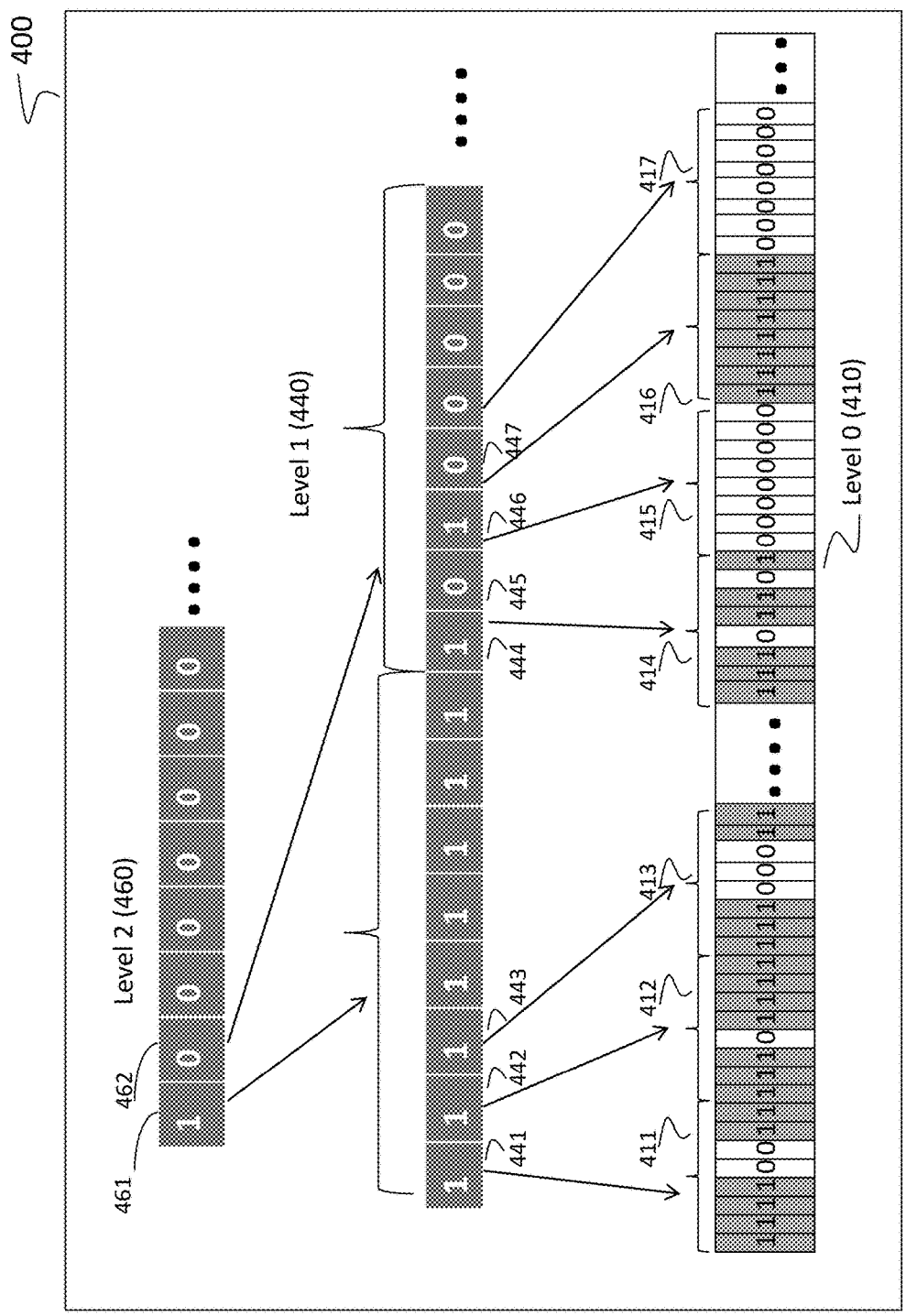
FIG. 4 illustrates a schematic diagram of an exemplified location-informative data structure in accordance with certain embodiments of the presently disclosed subject matter.

Referring to FIG. 4, there is illustrated a schematic diagram of an exemplified location-informative data structure in accordance with certain embodiments of the presently disclosed subject matter. By way of non-limiting example, a location informative data structure can be implemented as a hierarchical multilevel bitmap. A bitmap is an array of bits in which each bit corresponds to a certain part of storing media, while values "1" or "0" in the bitmap indicate whether the respective part of memory is available for storage or currently in use.

A bitmap can require a low overhead, for example, a 32 KB bitmap may be used for a 1 GB physical storage space, or a 32 MB bitmap used for a 1 TB physical storage space. However, when sizes of physical storage space are very large, scanning or traversing a flat bitmap may become inefficient with respect to either size or time. For example, a 32 GB size bitmap might be needed for a 1 Petabyte (PB) storage space. Scanning or traversing such a bitmap may require reading parts of the bitmap from disk(s), and this can significantly slow down the run-time of the allocation process.

In the multilevel bitmap 400 illustrated in FIG. 4, each bit in the lowest level (level_0) bitmap 410 corresponds to a physical address in the physical address space. Value "1" in the level_0 bitmap indicates that the respective data block is non-available and value "0" indicates that the data block is available for storage.

The bitmap 440 of the next level (level 1) is directly indicative of location of allocation chunks. Each bit in level_1 bitmap is indicative of availability of a predefined number K of predefined consecutive data blocks constituting a data chunk of K data blocks, the data chunk non-overlapping with data chunk represented by another bit. Value "1" in the level_1 bitmap indicates that the respective data chunk does not comprise a predefined number K of available consecutive data blocks, i.e. at least one bit among K respective bits in level_0 bitmap has value "1". Value "0" in the bitmap indicates that all consecutive K data blocks in the respective data chunk are available, i.e. all K respective bits in level_0 bitmap have value "0". Thus, values "0" in level_1 bitmap indicate allocation chunks detailed with reference to FIGS. 2-3. Each bit in level_1 bitmap corresponds to physical addresses between the first and the last data blocks in the data chunk represented by the bit.

In the schematic diagram illustrated in FIG. 4, each of data chunks 411-417 is constituted by 8 data blocks with data chunk's availability indicated by bitmap 440. Bits 441, 442, 443, 444 and 446 with value "1" indicate that data chunks 411, 412, 413, 414 and 416 do not comprise K=8 available consecutive data blocks, while bits 445 and 447 with logical "0" indicate that data chunks 415 and 417 are allocation chunks. Number of bits in bitmap 440 is equal to number of bits in bitmap 410 divided by K.

Each bit in level_2 bitmap 460 is indicative of aggregated availability status of a predefined number N of data chunks mapped by the bitmap 440 (preferably, but not necessarily, N=K). Value "0" (denoted as 462) in the level_2 bitmap indicates existence of at least one allocation data chunk among N data chunks corresponding to this bit (i.e. existence, among N respective bits of level_1 map 440 of at least one bit with value "0"). Value "1" (denoted as 461) in the level_2 bitmap indicates that none of N data chunks corresponding to this bit can be used as an allocation chunk (i.e.

all N respective bits of level_1 map 440 have value "1"). Number of bits in bitmap 460 is equal to number of bits in bitmap 440 divided by N.

The data structure 400 can have one or more further hierarchical levels (not shown), each bit in the next level indicative of aggregated availability status of a predefined number (preferably, but not necessarily, the same number for all levels) of bits in a bitmap of a previous level. Value "0" in a level_(i+1) bitmap indicates existence of at least one bit with value "0" among $N_{i+1}$ corresponding bits in level_i bitmap. Likewise, value "1" in a level (i+1) bitmap indicates that none of $N_{i+1}$ corresponding bits in level_i bitmap have value "0". The number of levels in the location-indicative data structure can be defined as roughly $Log_N(Y)$, where Y is the total number of bits in the level 0 bitmap and N is a number of bits of a previous level aggregated in a respective next level.

Referring to FIG. 5, there is illustrated a schematic diagram of an alternative exemplified location-informative data structure in accordance with certain embodiments of the presently disclosed subject matter.

Likewise in the multilevel bitmap 400, multilevel bitmap 500 illustrated in FIG. 5, each bit in the lowest level (level_0) bitmap 510 corresponds to a physical address in the physical address space. Value "1" in the level_0 bitmap indicates that the respective data block is non-available and value "0" indicates that the data block is available for storage.

The bitmap 540 of the next level (level 1) is directly indicative of location of allocation chunks. Likewise in the bitmap 440, each bit in level_1 bitmap is indicative of availability of a predefined number K of consecutive data blocks constituting a data chunk of K data blocks. Number of bits in bitmap 540 is equal to number of bits in bitmap 510, and each bit in level_1 bitmap is indicative of availability of a data chunk of K consecutive data blocks starting from location corresponding to the respective bit. The data chunks represented by any K consecutive bits are partially overlapping.

Likewise in the data structure 400, value "1" in the level_1 bitmap 540 indicates that corresponding data chunk does not comprise a predefined number K of available consecutive data blocks. Value "0" in the level_1 bitmap indicates that all consecutive K data blocks in the corresponding data chunk are available.

In the schematic diagram illustrated in FIG. 5, bits 541, 542, 543, 546, 547 and 548 with value "1" indicate that data chunks constituted by 4 data blocks and starting from $1^{st}$, $2^{nd}$, $3^{rd}$, $6^{th}$, $7^{th}$ and $8^{th}$ data blocks do not comprise K=4 available consecutive data blocks, while bits 544 and 545 with logical "0" indicate that data chunks starting from $4^{th}$ and $5^{th}$ data blocks are allocation chunks for K=4 consecutive blocks available for storage.

Likewise in bitmap 460, each bit in level_2 bitmap 560 is indicative of aggregated availability status of a predefined number N of data chunks mapped by the bitmap 540. Values "0" (denoted as 561 and 562) in the level_2 bitmap indicate existence of at least one allocation data chunk among data blocks corresponding to this bit (i.e. existence, among N respective bits of level_1 map 540 of at least one bit with value "0"). Value "1" (denoted as 563) in the level_2 bitmap indicates that none of data blocks corresponding to this bit constitute an allocation chunk (i.e. all N respective bits of level_1 map 540 have value "1").

The location-informative data structure implemented as a hierarchical multilevel bitmap (e.g. as detailed with reference to FIG. 4 or FIG. 5) enables the allocation module to quickly determine a location of allocation chunks without searching through the entire data structure.

When traversing the hierarchical multilevel bitmap configured as above, the allocation module shifts (e.g. starting from the left end) through bits of the highest level until finding a bit with value "0" (e.g. 462 or 561). When such a bit is found, the allocation module shifts through N bits in the previous level bitmap represented by the found bit, until finding a bit with value "0" (e.g. 445). The process is continued for each next lower hierarchical level until getting down to level_1 bitmap which directly maps the allocation chunks. Upon finding in level_2 bitmap a bit with value "0", the allocation module shifts through respective K bits in the level_1 bitmap until finding a bit with value"0" (e.g. 445 or 544), this bit being indicative of the location of the allocation chunk to be allocated. It is noted that value "1" in a higher level bitmap indicates that data chunks corresponding to the respective bit all do not have the required number of available consecutive data blocks, hence the respective bits in lower bitmaps are not required to be searched for allocation purposes.

The cache memory 108 can store the entire location-indicative data structures 400 or 500, thereby enabling faster allocation. Optionally, depending on the number of location-indicative data structures and size thereof, the cache memory 108 can store only one or more top levels of each location-indicative data structure, while the rest levels of each of location-indicative data structure can be stored on disks.

It is to be understood that the presently disclosed subject matter is not limited in its application to the details set forth in the description contained herein or illustrated in the drawings. The presently disclosed subject matter is capable of other embodiments and of being practiced and carried out in various ways.

It will also be understood that the presently disclosed subject matter further contemplates a non-transitory machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

What is claimed is:

1. A method of operating a storage system comprising a plurality of physical storage devices constituting a physical storage space characterized by physical addresses and controlled by a plurality of storage control devices constituting a storage control layer, the storage control layer operable to represent to a plurality of hosts a logical address space divided into one or more logical groups, the method comprising:

accommodating, in a memory accessible to the storage control layer, a plurality of data structures, each given data structure being associated with a logical group and informative of a location in the physical storage space of allocation chunks, each of the allocation chunks being characterized by a predefined number K of available consecutive physical addresses, wherein the predefined number K is equal for all of the allocation chunks indicated by the given data structure, and wherein there are at least two data structures such that a first number K predefined for all allocation chunks indicated by a first data structure differs from a second number K predefined for all allocation chunks indicated by a second data structure;

prior to writing to the physical storage space a data chunk associated with a given logical group, identifying, among the plurality of data structures, a data structure associated with the given logical group and informative of a location of allocation chunks with the predefined number K equal to a number M of consecutive physical addresses required for storing the data chunk;

allocating, for the data chunk, M consecutive physical addresses in accordance with the location of the allocation chunk, the location of the allocation chunk being obtained from the identified data structure; and upon completion of writing the data chunk, updating, in accordance with availability of consecutive physical addresses resulted from completion, at least all data structures associated with all logical groups sharing at least part of the physical address space with the identified data structure, wherein each given data structure is configured as a hierarchical multilevel bitmap comprising at least two bitmaps, wherein a first bitmap of the at least two bit maps is a bitmap of the lowest level, wherein each bit in the first bitmap corresponds to a physical address in the physical address space and bears indication of availability of a corresponding data block, wherein each bit in a second bitmap, which is a parent of the first bitmap and a higher level bitmap than the first bitmap, corresponds to K bits in the first bitmap and bears indication of availability of an allocation chunk of K consecutive data blocks corresponding to respective K bits in the first bitmap, and wherein obtaining location from the identified data structure comprises traversing the hierarchical multilevel bitmap starting from the highest level bitmap of the hierarchical multilevel bitmap and subsequently going to a next lower level bitmap.

2. The method of claim 1, wherein the identified data structure further comprises a third bitmap, which is a parent of the second bitmap and a higher level bitmap than the second bitmap, and wherein each bit of the third bitmap corresponds to a predefined number N of bits in the second bitmap and bears an indication of an aggregated availability status of corresponding N data chunks mapped by the second bitmap.

3. The method of claim 1, wherein the identified data structure comprises a plurality of third bitmaps organized in hierarchical manner, wherein each bit in a third bitmap, which is a parent of the second bitmap, corresponds to a predefined number N of bits in the second bitmap and bears an indication of an aggregated availability status of corresponding N data chunks mapped by the second bitmap, and wherein each bit in a third bitmap of a next hierarchical level corresponds to a predefined number N of bits in a previous hierarchical level and bears an indication of an aggregated availability status of corresponding N data chunks mapped by N bits of the previous level bitmap.

4. The method of claim 2, wherein a number of levels in the data structure are defined by Log N(Y), where Y is the total number of bits in the first bitmap and N=K.

5. A storage system comprising a plurality of physical storage devices constituting a physical storage space characterized by physical addresses and controlled by a plurality of storage control devices constituting a storage control layer, the storage control layer operable to represent to a plurality of hosts a logical address space divided into one or more logical groups, the system comprising:

a memory accessible to the storage control layer and configured to accommodate a plurality of data structures, each given data structure being associated with a logical group and informative of a location in the physical storage space of allocation chunks, each of the allocation chunks being characterized by a predefined number K of available consecutive physical addresses, wherein the predefined number K is equal for all of the allocation chunks indicated by the given data structure, and wherein there are at least two data structures such that a first number K predefined for all allocation chunks indicated by a first data structure differs from a second number K predefined for all allocation chunks indicated by a second data structure; and a processor operatively coupled to the memory and configured to:

prior to writing to the physical storage space a data chunk associated with a given logical group, identify, among the plurality of data structures, a data structure associated with the given logical group and informative of a location of allocation chunks with the predefined number K equal to a number M of consecutive physical addresses required for storing the data chunk;

allocate, for the data chunk, M consecutive physical addresses in accordance with the location of the allocation chunk, the location of the allocation chunk being obtained from the identified data structure; and upon completion of writing the data chunk, update, in accordance with availability of consecutive physical addresses resulted from completion, at least all data structures associated with all logical groups sharing at least part of the physical address space with the identified data structure, wherein each data given structure is configured as a hierarchical multilevel bitmap comprising at least two bitmaps, wherein a first bitmap of the at least two bit maps is a bitmap of the lowest level, wherein each bit in the first bitmap corresponds to a physical address in the physical address space and bears indication of availability of a corresponding data block, wherein each bit in a second bitmap, which is a parent of the first bitmap and a higher level bitmap than the first bitmap, corresponds to K bits in the first bitmap and bears indication of availability of an allocation chunk of K consecutive data blocks corresponding to respective K bits in the first bitmap, and wherein obtaining location from the identified data structure comprises traversing the hierarchical multilevel bitmap starting from the highest level bitmap of the hierarchical multilevel bitmap and subsequently going to a next lower level bitmap.

6. The system of claim 5, wherein the identified data structure further comprises a third bitmap, which is a parent of the second bitmap and a higher level bitmap than the second bitmap, and wherein each bit of the third bitmap corresponds to a predefined number N of bits in the second bitmap and bears an indication of an aggregated availability status of corresponding N data chunks mapped by the second bitmap.

7. The system of claim 5,
wherein the identified data structure comprises a plurality of third bitmaps organized in hierarchical manner,
wherein each bit in a third bitmap, which is a parent of the second bitmap, corresponds to a predefined number N of bits in the second bitmap and bears an indication of an aggregated availability status of corresponding N data chunks mapped by the second bitmap, and
wherein each bit in a third bitmap of a next hierarchical level corresponds to a predefined number N of bits in a previous hierarchical level and bears an indication of an aggregated availability status of corresponding N data chunks mapped by N bits of the previous level bitmap.

8. The system of claim 6, wherein a number of levels in the data structure are defined by Log N(Y), where Y is the total number of bits in the first bitmap and N=K.

9. A computer program product implemented on a non-transitory computer usable medium having computer readable program code embodied therein to cause the computer to perform a method of operating a storage system comprising a plurality of physical storage devices constituting a physical storage space characterized by physical addresses and controlled by a plurality of storage control devices constituting a storage control layer, the storage control layer operable to represent to a plurality of hosts a logical address space divided into one or more logical groups, the method comprising:
   accommodating, in a memory accessible to the storage control layer, a plurality of data structures, each given data structure being associated with a logical group and informative of a location in the physical storage space of allocation chunks, each of the allocation chunks being characterized by a predefined number K of available consecutive physical addresses, wherein the predefined number K is equal for all of the allocation chunks indicated by the given data structure, and wherein there are at least two data structures such that a first number K predefined for all allocation chunks indicated by a first data structure differs from a second number K predefined for all allocation chunks indicated by a second data structure;
   prior to writing to the physical storage space a data chunk associated with a given logical group, identifying, among the plurality of data structures, a data structure associated with the given logical group and informative of a location of allocation chunks with the predefined number K equal to a number M of consecutive physical addresses required for storing the data chunk;
   allocating, for the data chunk, M consecutive physical addresses in accordance with the location of the allocation chunk, the location of the allocation chunk being obtained from the identified data structure; and
   upon completion of writing the data chunk, updating, in accordance with availability of consecutive physical addresses resulted from completion, at least all data structures associated with all logical groups sharing at least part of the physical address space with the identified data structure,
      wherein each given data structure is configured as a hierarchical multilevel bitmap comprising at least two bitmaps,
      wherein a first bitmap of the at least two bit maps is a bitmap of the lowest level,
      wherein each bit in the first bitmap corresponds to a physical address in the physical address space and bears indication of availability of a corresponding data block,
      wherein each bit in a second bitmap, which is a parent of the first bitmap and a higher level bitmap than the first bitmap, corresponds to K bits in the first bitmap and bears indication of availability of an allocation chunk of K consecutive data blocks corresponding to respective K bits in the first bitmap, and
      wherein obtaining location from the identified data structure comprises traversing the hierarchical multilevel bitmap starting from the highest level bitmap of the hierarchical multilevel bitmap and subsequently going to a next lower level bitmap.

10. The computer program product of claim 9,
wherein the identified data structure further comprises a third bitmap, which is a parent of the second bitmap and a higher level bitmap than the second bitmap, and
wherein each bit of the third bitmap corresponds to a predefined number N of bits in the second bitmap and bears an indication of an aggregated availability status of corresponding N data chunks mapped by the second bitmap.

11. The computer program product of claim 9,
wherein the identified data structure comprises a plurality of third bitmaps organized in hierarchical manner,
wherein each bit in a third bitmap, which is a parent of the second bitmap, corresponds to a predefined number N of bits in the second bitmap and bears an indication of an aggregated availability status of corresponding N data chunks mapped by the second bitmap, and
wherein each bit in a third bitmap of a next hierarchical level corresponds to a predefined number N of bits in a third bitmap of a previous hierarchical level and bears an indication of an aggregated availability status of corresponding N data chunks mapped by N bits in the third bitmap of the previous level.

* * * * *